United States Patent [19]
Caradant

[11] Patent Number: 6,041,739
[45] Date of Patent: Mar. 28, 2000

[54] AQUARIUM SUPPORTING STRUCTURE

[76] Inventor: Jean-Pierre Caradant, 1331 Van Horne, Outremont, Québec, Canada, H2V 1K7

[21] Appl. No.: 09/245,366

[22] Filed: Feb. 5, 1999

[51] Int. Cl.⁷ .................................................. A01K 63/00
[52] U.S. Cl. ...................... 119/247; 119/245; 248/200.1
[58] Field of Search ................................... 119/245, 247, 119/253, 257, 269; 248/200.1, 328, 329, 332; 211/207, 117; 312/107, 114, 119, 122, 131, 249.1

[56] References Cited

U.S. PATENT DOCUMENTS

| | | |
|---|---|---|
| 493,596 | 3/1893 | McLeran . |
| 583,873 | 6/1897 | Williams . |
| 596,176 | 12/1897 | Naylor . |
| 1,634,750 | 7/1927 | Jones . |
| 1,663,297 | 3/1928 | Fruehauf . |
| 5,263,772 | 11/1993 | Ritzow .................................. 312/138.1 |

*Primary Examiner*—Michael J. Carone
*Assistant Examiner*—James S. Bergin

[57] ABSTRACT

An aquarium structure which has first and second vertical support members extending between a lower substrate and an upper substrate, an aquarium mounted between the first and second vertical support members and being moveable in a vertical direction by means of pulleys mounted on the vertical support members, bottom pulleys mounted on bottom corners of the aquarium bottom wall and aquarium end wall, and a wind up pulley, a cable being extended between the wind up pulley, a pulley on one of the support members, around the bottom pulleys, and a second pulley on the second support member. There is also disclosed an embodiment wherein two aquariums are provided which can then be moved in a vertical direction to form a partition wall.

7 Claims, 5 Drawing Sheets

AQUARIUM SUPPORTING STRUCTURE

BACKGROUND OF THE INVENTION

The present invention relates to aquariums and more particularly, relates to vertically moveable aquariums.

There are many known structures for supporting aquariums or indeed other objects. Generally, aquariums have been placed on a supporting structure such as a tabletop. In many instances, the supporting structure has been specifically designed for aquariums. However, such structures add substantially to the cost and are not necessarily aesthetically pleasing.

A known structure for supporting an aquarium and which provides for horizontal sliding relationship is disclosed in U.S. Pat. No. 5,263,772 to Gerald R. Ritzow on Nov. 23, 1993. This patent provides a surface having horizontally extending guide tracks for receiving border frames of an aquarium tank in horizontal sliding relationship therewith and providing an arrangement to prevent lateral shifting movement of the tank.

SUMMARY OF THE INVENTION

It is an object of the present invention to provide an aquarium tank supporting structure wherein the aquarium is vertically moveable.

It is a further object of the present invention to provide an aquarium supporting structure wherein a plurality of aquariums may be mounted thereon.

It is a further object of the present invention to provide an aquarium supporting structure wherein aquariums may be used as at least a portion of a partition wall for aesthetic purposes.

According to one aspect of the present invention, there is provided an aquarium structure comprising first and second vertical support members designed to extend between a lower substrate and an upper substrate; an aquarium having a front wall and a back wall, a top wall and a bottom wall, and first and second end walls, the aquarium being sized such that the first and second end walls lie proximate the first and second vertical support members respectively; a first pulley mounted on the first vertical support member, a second pulley mounted on the second vertical support member, a bottom pulley mounted at each bottom corner between the aquarium bottom wall and a respective aquarium end wall; a wind up pulley mounted on the first vertical support member; and a cable having a first end secured to the wind up pulley, the cable extending from the wind up pulley around the first pulley, then around the bottom pulleys, and subsequently around the second pulley, a second end of the cable being secured to a fixed attachment point on the second vertical support member.

According to a further aspect of the present invention, there is provided an aquarium structure comprising first and second vertical support members; first and second aquariums, each aquarium having a front wall and a back wall, a top wall and a bottom wall, and first and second end walls; first and second horizontal arms extending outwardly on opposite sides from an upper portion of the first vertical support member; third and fourth horizontal arms extending outwardly on opposite sides from an upper portion of the second vertical support member; first, second, third and fourth pulleys mounted on the first, second, third and fourth horizontal arms respectively; first and second wind up pulleys mounted on the first vertical support member; bottom pulleys mounted at each bottom corner of each of the aquariums between a respective aquarium bottom wall and a respective aquarium end wall; first and second cables, the first cable having a first end secured to the first wind up pulley, the first cable extending from the first wind up pulley around the first pulley, then around the bottom pulleys of the first aquarium, and subsequently around the third pulley, a second end of the first cable being secured to a fixed attachment point on the second vertical support member; the second cable having a first end secured to the second wind up pulley, the second cable extending from the second wind up pulley around the second pulley, then around the bottom pulleys of the second aquarium, and subsequently around the fourth pulley, a second end of the second cable being secured to the fixed attachment point on the second vertical support member.

The aquarium structures of the present invention may be utilized with a single aquarium or a plurality thereof and in particular, a preferred embodiment resides in the use of two aquariums to form a partition wall.

The aquariums utilized may be of a conventional type, generally of an overall rectangular configuration and provided with a bottom wall which is of sufficient strength to support the weight of the aquarium.

In one embodiment, each of the first and second vertical support members have a respective facing side wall, and each of the first and second pulleys are mounted such that a portion of each of the first and second pulleys extends through the respective facing side wall.

Preferably, the aquarium structure is such that each of the first and second vertical support members is associated with a respective base plate, each of the base plates having means for securement to the lower substrate such as a floor or a reinforced structure.

Preferably, the aquarium structure is arranged such that each of the first and second vertical support members includes means for longitudinally adjusting the length of each of the members to thereby tension each of the support members between the lower substrate and the upper substrate.

Preferably, the aquarium structure is one wherein each of the first and second end walls has first and second guiding means respectively mounted thereon, the first and second guiding means being adapted to at least partially encircle the first and second vertical support members respectively.

In a preferred arrangement, the aquarium structure is one wherein each of the first and second end walls has an upper guiding means and a lower guiding means, each of the upper and lower guiding means comprising a substantially U-shaped member secured to respective end walls of the aquarium.

A preferred embodiment provides for an arrangement wherein each of the first and second vertical support members includes a plurality of vertically aligned spaced apertures extending through the support members, with the guiding means each including an aperture designed to be in registry with at least one of the aligned apertures, and a locking pin insertable through the apertures of the guiding means and vertical support members to lock the aquarium at a desired height.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
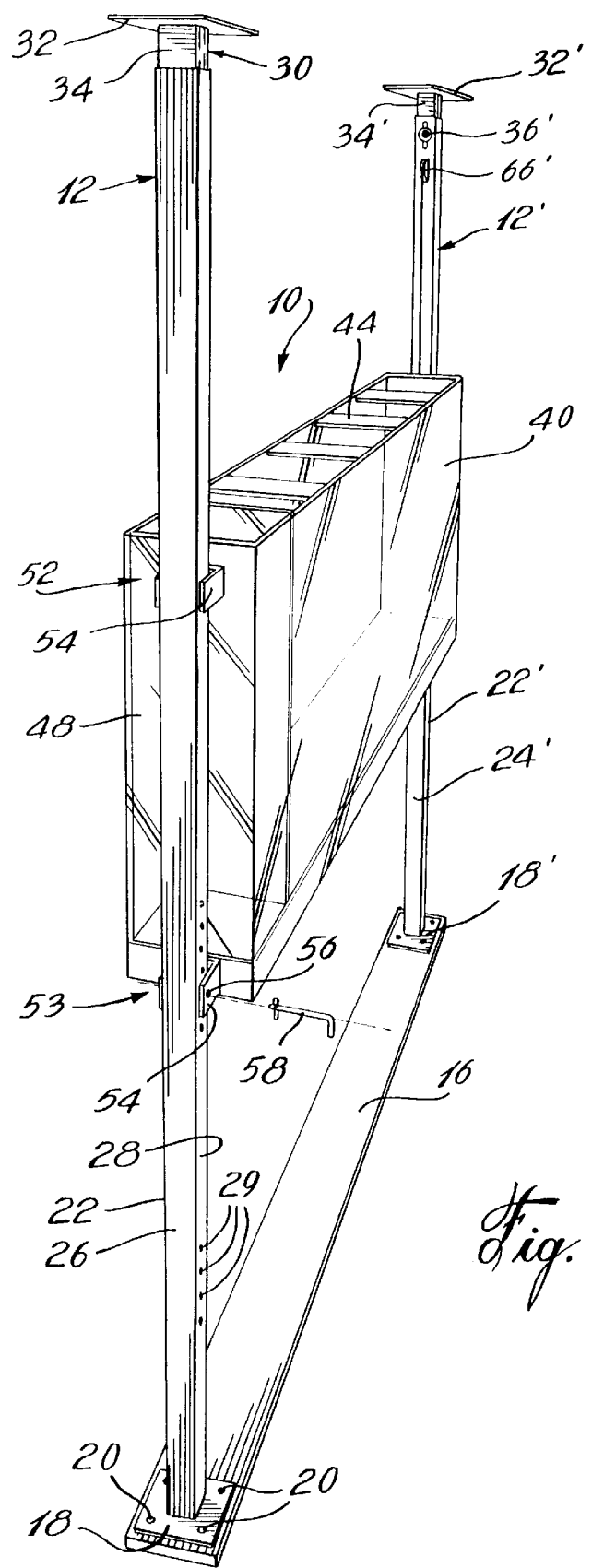
FIG. 1 is a perspective view of an aquarium and associated supporting structure with certain accessory components removed.

Referring to the drawings in greater detail and by reference characters thereto, there is illustrated in FIG. 1 an aquarium generally designated by reference numeral 10 and its associated support structure.

The support structure of FIG. 1 comprises first and second support members 12 and 12' respectively. Both support members 12, 12' are similar and similar reference numerals with a prime (') are used for identical components.

A substrate 16 is provided and which extends between support members 12, 12' for distributing the load on a bottom surface such as a floor or substrate 16 may be a floor.

With support member 12, there is provided a base plate 18 designed to seat on substrate 16 and which base plate 18 has a plurality of apertures 20 formed therein for securement to substrate 16 by means of suitable attachment means (not shown) including screws and the like.

Extending upwardly from base plate 18 is a vertical post 22 having an inner wall 24, an outer wall 26 and a pair of side walls 28. Side walls 28 include a plurality of vertically aligned apertures 29 formed therein.

At the top of post 22, there is provided an extension member generally designated by reference numeral 30 and which includes a top plate 32 designed to seat against a ceiling or the like and an inner post 34 which fits within post 22. Adjustment means 36' are provided for retaining inner post 34' in a desired position such that the supporting member 12' is retained in a slightly tensioned condition. Such means are well known in the art and may include screw adjustments and the like.

Aquarium 10 includes a front wall 40, a rear wall 42, a top wall 44, a bottom wall 46, and end walls 48, 50. Secured to end walls 48 and 50 are upper guiding members 52 and lower guiding members 53. Each of the guiding members 52, 53 comprise a U-shaped member having a pair of flange walls 54 extending outwardly proximate side walls 28. Each flange wall 54 of lower guiding members 53 include an aperture 56 and which aperture 56 is positioned that it may be aligned in registry with one of apertures 29 formed in side walls 28. A locking pin 58 may then be inserted through apertures 56 and 29 to lock the aquarium in a desired position.

Mounted within inner wall 24 of each post 22 is a pulley generally designated by reference numeral 66. As may be seen in FIG. 2, pulleys 66 are mounted such that a first portion of each of the pulleys extends interiorly of post 22 while a further portion extends outwardly through inner wall 24.

Figure 2:
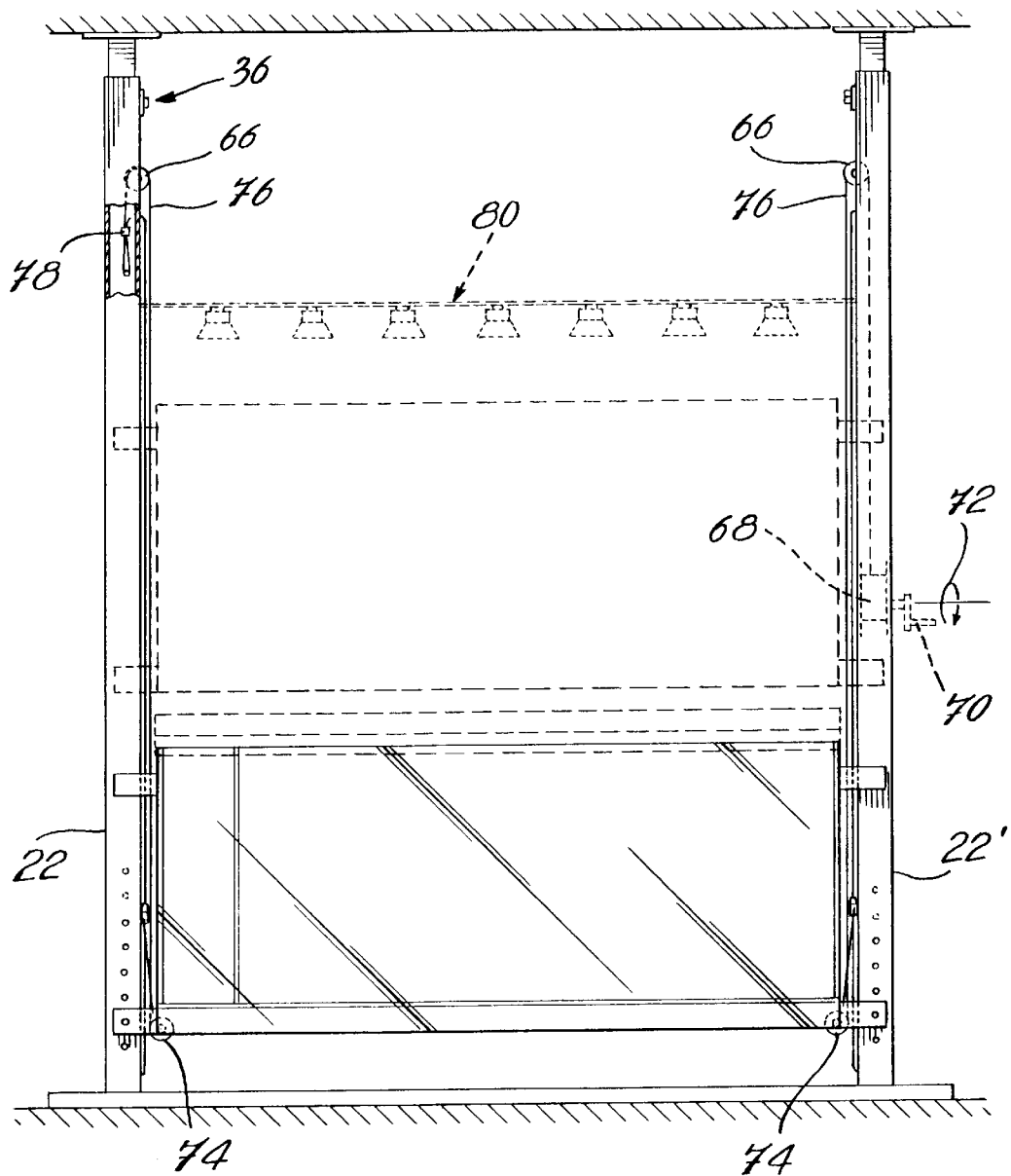
FIG. 2 is a front elevational view thereof.

Mounted within post 22, as seen in FIG. 2, is a wind up pulley 68 having a handle 70 secured thereto and designed to rotate as indicated by arrow 72.

Figure 3:
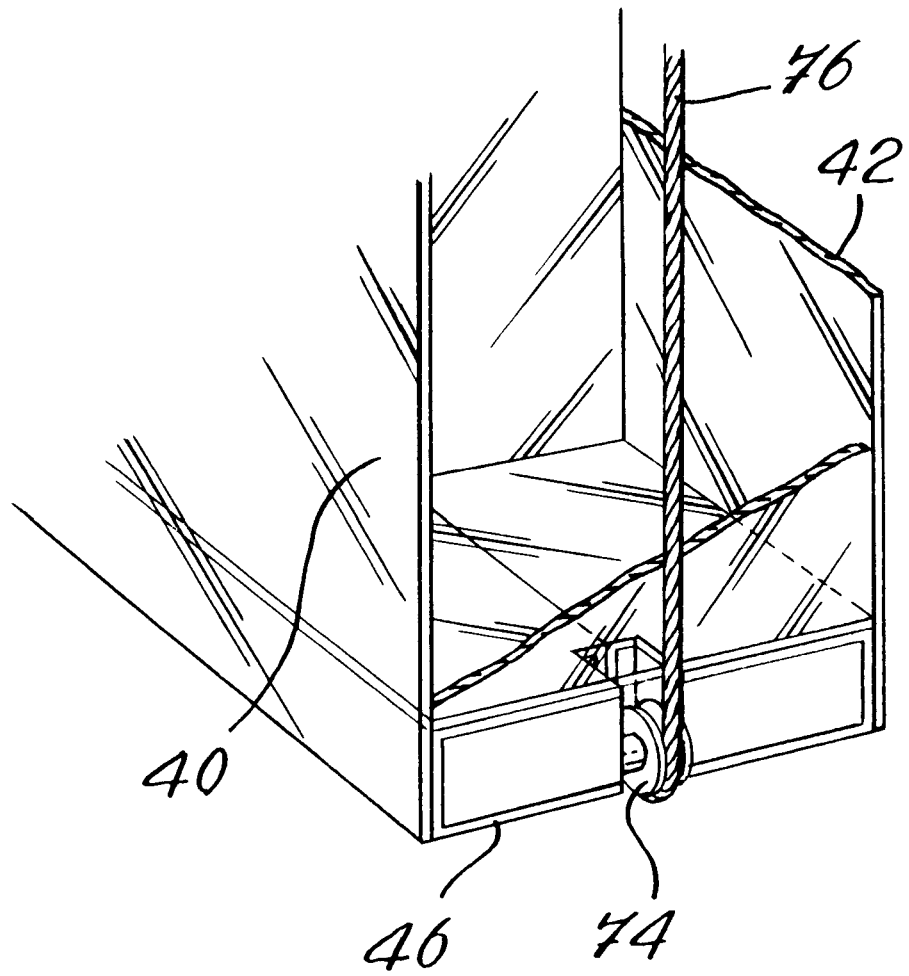
FIG. 3 is a detail view of a bottom corner portion of the aquarium of FIGS. 1 and 2 showing a pulley arrangement.

Mounted at the corners formed at bottom wall 46 and end walls 48 and 50, and as may best be seen in FIG. 3, are bottom pulleys 74.

The arrangement is such that a cable extends from wind up pulley 68 around pulley 66 on post 22', downwardly adjacent inner wall 24', around bottom pulleys 74, upwardly adjacent inner wall 24 of post 22, and subsequently around pulley 66 on post 22 to an attachment point generally designated by reference numeral 78.

In the above arrangement, it will be seen that aquarium 10 may be easily adjusted to any desired position and when the position is reached, locking pins 58 may be inserted to retain the aquarium in the desired position. Naturally, this may be associated with a ratchet and pawl arrangement for wind up pulley 68 for security reasons.

As shown in FIG. 2, the arrangement may be utilized to provide for various aquarium accessories such as a plurality of lights 80. A suitable electrical wiring arrangement mounted within the interior of posts 22 may be provided.

In conjunction with the above, different security arrangements may be provided. As seen from the drawings, the use of one or more locking pins in both upper and lower guiding means can assist in providing security in case of any problems. Similarly, as mentioned, the wind up pulleys may have a ratchet and pawl arrangement to prevent any release of the aquarium. Still further, one may provide a double cable structure for security reasons in case of any breakage of a cable. The complete wind up system could be doubled to provide additional security. Additionally, the use of retention cables to stop any fall of the aquarium could be employed.

Figure 4:
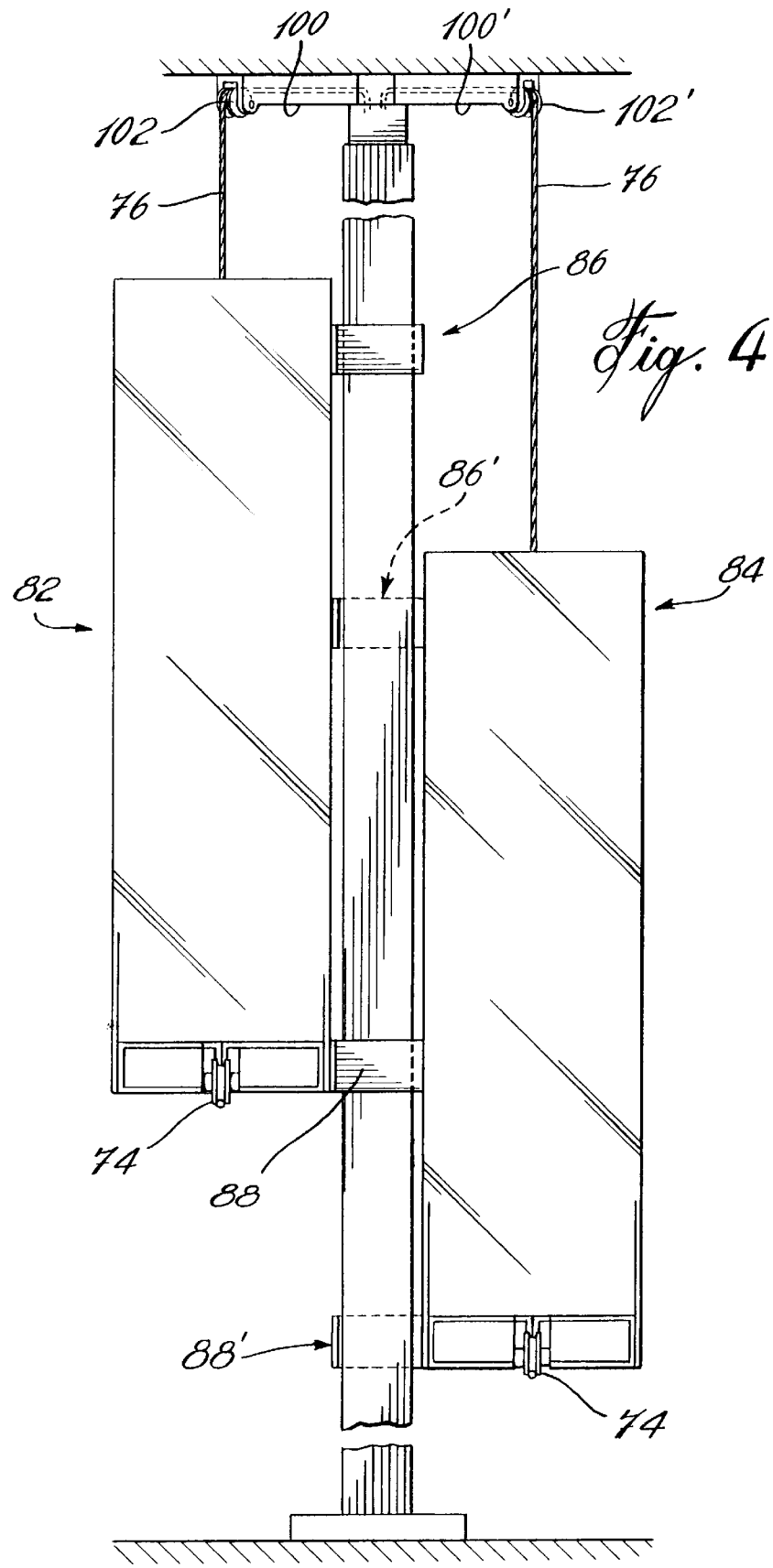
FIG. 4 is a side elevational view of a further embodiment of the present invention.
Figure 5:
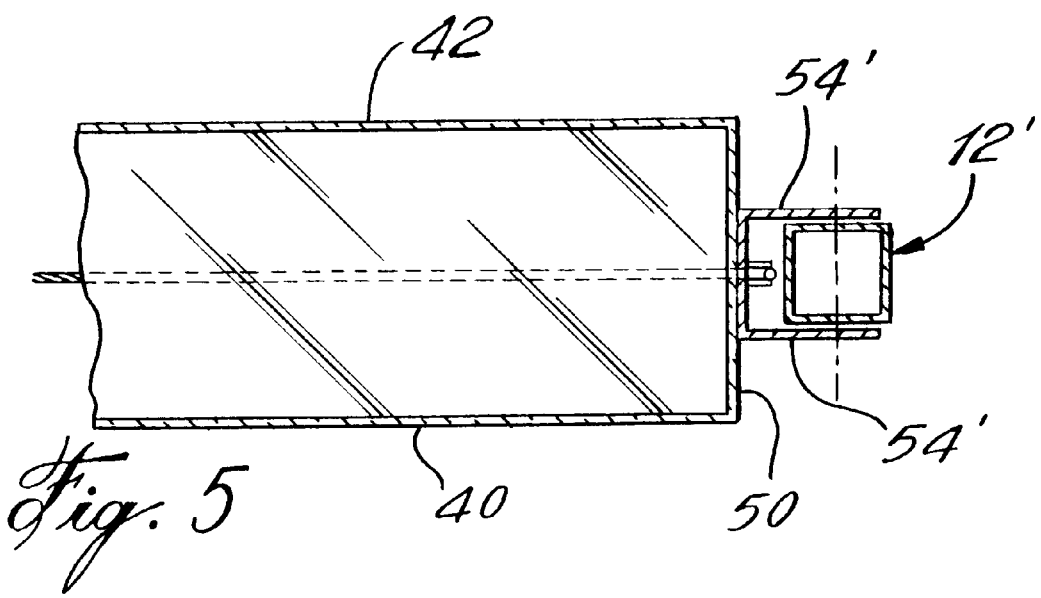
FIG. 5 is a detail view showing a supporting member and guiding means associated with the aquarium for the embodiment of FIG. 1.

An alternative embodiment is illustrated in FIG. 4 and since many components are similar, similar reference numerals will be utilized. One of the major differences in the embodiment of FIG. 4 is the provision of a first aquarium 82 and a second aquarium 84 each mounted on vertical support members such that they may be moved upwardly and downwardly as desired and may indeed form a partition wall when one aquarium is in an upper position and the second aquarium is in a lower position.

The embodiment of FIG. 4, as above mentioned, uses first and second aquariums in a side by side relationship. At the upper end of vertical support members, there is provided horizontal arms 100 and 100' for each vertical support member and which extend outwardly from opposite sides of the vertical support member. Pulleys 102 and 102' are mounted on horizontal arms 100, 100' respectively with a similar arrangement being employed at the other vertical support member. In turn, there is a cable 76 and 76' associated with aquarium 82 and 84 respectively and which cables run in a manner similar to that illustrated with respect to the embodiment of FIG. 1.

Figure 6:
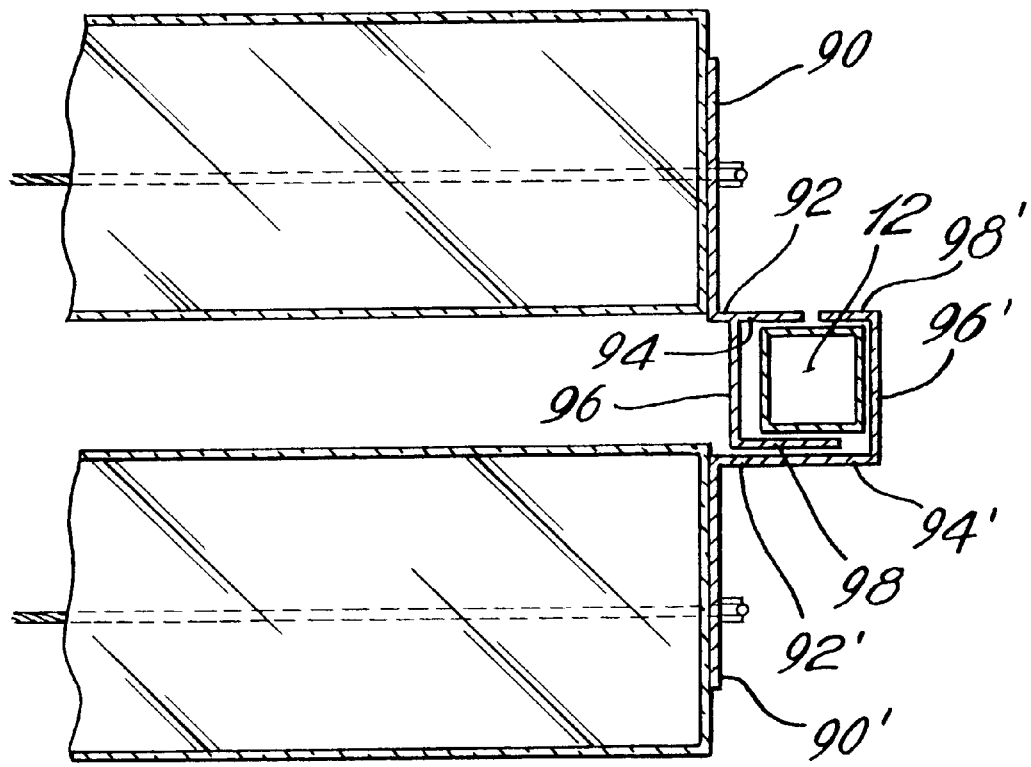
FIG. 6 is a view similar to FIG. 5 for the embodiment illustrated in FIG. 4.

In this arrangement, each of the aquariums 82, 84 is provided with upper guide members 86, 86' and lower guide members 88, 88'. Referring to FIG. 6, wherein the guide member structure is illustrated, there is an L-shaped flange having a first arm 90 secured to an aquarium end wall 48 and a second arm 92 extending outwardly therefrom. A C-shaped guiding member has a first arm 94 secured to arm 92. A second arm 96 extends outwardly parallel to inner wall 24 while a third arm 98 extends adjacent side wall 28. A reverse configuration is provided for second aquarium 84 such that the aquariums can be moved upwardly and downwardly as required.

It will be understood that the above described embodiments are for purposes of illustration only and that changes and modifications may be made thereto without departing from the spirit and scope of the invention.

I claim:

1. An aquarium structure comprising:

first and second vertical support members designed to extend between a lower substrate and an upper substrate;

an aquarium having a front wall and a back wall, a top wall and a bottom wall, and first and second end walls, said aquarium being sized such that said first and second end walls lie proximate said first and second vertical support members respectively;

a first pulley mounted on said first vertical support member, a second pulley mounted on said second vertical support member, a bottom pulley mounted at each bottom corner between said aquarium bottom wall and a respective aquarium end wall;

a wind up pulley mounted on said first vertical support member; and a cable having a first end secured to said wind up pulley, said cable extending from said wind up pulley around said first pulley, then around said bottom pulleys, and subsequently around said second pulley, a second end of said cable being secured to a fixed attachment point on said second vertical support member.

2. The aquarium structure of claim 1 wherein each of said first and second vertical support members have a respective facing side wall, each of said first and second pulleys being mounted such that a portion of each of said first and second pulleys extends through the respective facing side wall.

3. The aquarium structure of claim 1 wherein each of said first and second vertical support members has a respective base plate, each of said base plates having means for securement thereof to said lower substrate.

4. The aquarium structure of claim 3 wherein each of said first and second end walls has an upper guiding means and a lower guiding means, each of said upper and lower guiding means comprising a substantially U-shaped member secured to respective end walls of said aquarium.

5. The aquarium structure of claim 1 wherein said first and second vertical support members each further includes means for longitudinally adjusting each of said first and second vertical support members to thereby tension each of said vertical support members between said lower substrate and said upper substrate.

6. The aquarium structure of claim 1 wherein each of said first and second end walls has first and second guiding means respectively mounted thereon, said first and second guiding means adapted to at least partially encircle said first and second vertical support members respectively.

7. The aquarium structure of claim 6 wherein each of said first and second vertical support members includes a plurality of vertically aligned spaced apertures extending therethrough, said guiding means each including an aperture designed to be in registry with said aligned apertures, and a locking pin insertable through said apertures of said guiding means and said vertical support members to thereby lock said aquarium at a desired height.

* * * * *